Oct. 28, 1930.  O. M. BULLOCK  1,779,927
RAKE
Filed Jan. 21, 1928
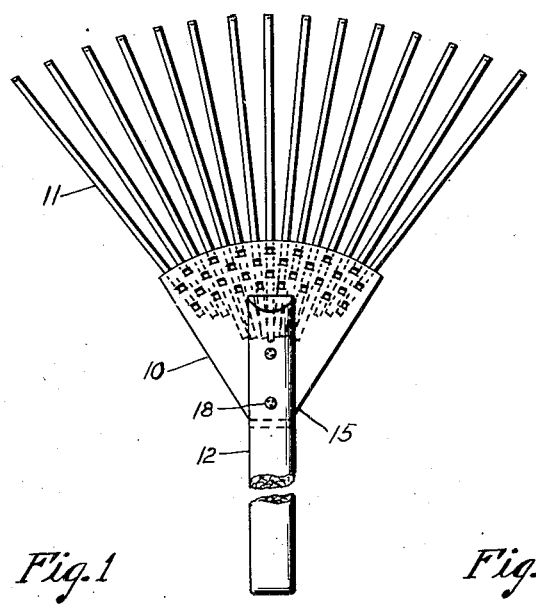
Fig.1
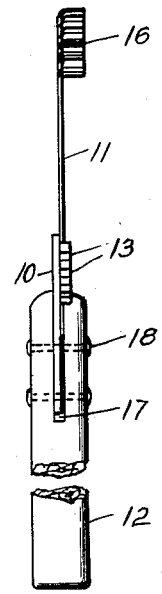
Fig.2
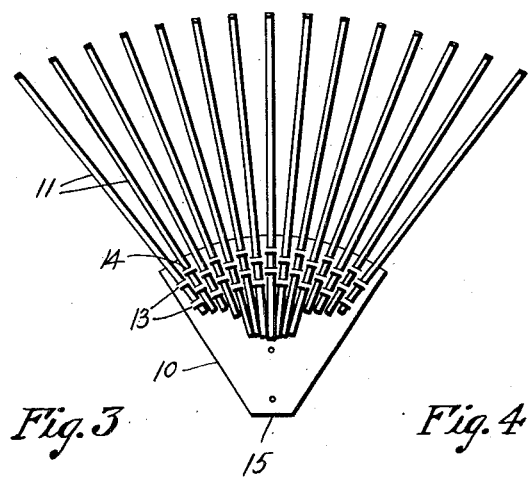
Fig.3
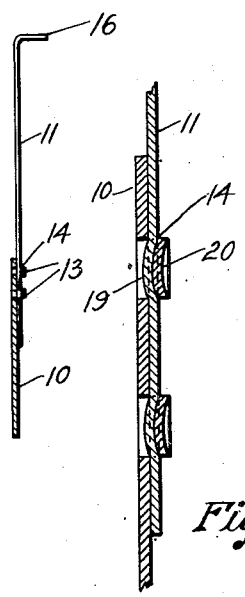
Fig.4
Fig.5
Inventor
Orin M. Bullock
By M. C. Frank
Attorney Patented Oct. 28, 1930

1,779,927

UNITED STATES PATENT OFFICE

ORIN M. BULLOCK, OF OAKLAND, CALIFORNIA

RAKE

Application filed January 21, 1928. Serial No. 248,279.

My invention relates broadly to rakes but more particularly to light hand rakes of the broom type, for light garden work such as the sweeping from lawns of its cut grass thereupon.

The objects of my invention include the provision of a simple, durable and inexpensive rake of the character set forth, one constructed in a manner that allows any tine of the rake portion to freely flex for its entire unsupported length irrespective of its adjacent tine, thus adapting the corner areas of the rake tines to furl or bend as if sweeping with a common floor broom.

Another object is the provision in a hand rake having its active portion constructed of a series of separate flat spring steel tines individually operative on garden refuse, such that the refuse will not clog the teeth of the rake due to the resiliency of the tines, each tine, as it were, reacting and kicking the refuse away as its tooth is released from service at the moment.

Other and ancillary objects of my invention will be suggested in the following description and in the uses to which my invention is put. Certain of the objects of my invention may be attained with the use of less than all its preferred features. It is desired, therefore, that my invention be limited only by the claims constituting its final determination.

Referring to the drawings forming part of this specification:

Figure 1 is a plan of my rake construction as viewed when in use, the handle being foreshortened.

Fig. 2 is a side view of Fig. 1, the transverse scale of the drawing being enlarged for clarity.

Fig. 3 is a reverse plan of the rake from that of Fig. 1, the handle being omitted.

Fig. 4 is an enlarged section through the rake head at any tine and showing the manner of support of the tine therein, and Fig. 5 is a magnified fragmental section of Fig. 4 showing indents in a tine caused by peening blows on points on the rake head to hold the tine fixedly in the rake head.

The preferred construction of my invention will now be described in detail.

The reference number 10 indicates the rake head of the present construction, 11 the tines thereof, and 12 the customary handle for the rake of the character described.

The rake head 10 is a piece of flat plate material, preferably sheet metal of suitable gauge and substantially triangular in shape and of small surface area compared to that of the flexing area of the rake proper, that is, the tine area. The larger latter area is desired for ease in raking to effect a limber flexure to overcome tiresome wrist strains encountered in continued raking, which feature is also an object of my invention.

The rake head has a series of broken transverse ridges 13 on one face thereof, preferably the under face, formed by depressing from the upper face the corresponding ridge areas. These ridges are slotted, as at 14, radially from the apex 15 of the plate 10, to receive one end of the tines 11 in snug fitting relation thereto, the said ends preferably extending beyond the ridge nearest the said apex for a purpose to be presently set forth.

A simple method of providing the slotted ridges 13 is to offset strap-like plate portions having only their ends attached to the plate whereby said portions cooperate with the plate portions laterally thereof to provide tine-receiving loops, the slots 14 being thus defined at the ends of the loop openings. The function of the ridges 13 by striking up the strap-like plate portions provides plate openings opposite the ridges, whereby tines engaged through the aforesaid loops may be flexed or bent into said openings, as is shown in Figure 5.

The tines 11, in the construction shown, are formed of flat spring steel material of a suitable width and gauge for the purpose designed. The free unsupported ends of the tines are bent angularly as is the usual practice in hand rakes, to form the teeth 16 of the rake.

The handle 12 of the rake is kerfed as at 17 for the embracement therein of the central portion of the plate 10 together with the extending ends of the central tines disposed in the kerf. A pair of rivets 18 may bind the whole in locking rigid engagement thereat.

It will be observed that the ridges 13 serve also as stiffening ribs to prevent transverse bending of the rake head in the normal use of the rake, while the handle portion embracing the rake head together with the contacting laced tine portions thereon and extending in the kerf, form a reinforcement which prevents longitudinal bending of the rake head and the buckling thereof.

It will be noted that each tine member 11 is a separate strip of material and separately positioned in its respective radial slot alignment. It is held in the desired set position by an indentation 19, shown clearly in Fig. 5, formed by a light blow from a peening hammer on the top side of each ridge area 20 of the series of broken ridges 13. The indents 19 formed thereby hold the woven or laced tines in effective integral and rigid engagement with the rake head.

In the drawings, I have shown an embodiment of my invention, but it is to be understood that the invention may be embodided in other forms, each being a species of my invention, and the patent protection that I desire, is all of that which comes within the spirit and scope of what I claim as new, and which claims are the following:

1. A hand rake comprising a rake head of flat plate material, a series of flat spring steel tine members lacedly supported by the head, and a handle provided with a kerf for the engagement therein of the plate, and said kerfed end of the handle adapted to embrace the free ends of the central tines for stiffening the plate.

2. A hand rake comprising a rake head of flat plate material provided with a series of transverse slotted ridges, a series of flat spring steel tine members lacedly supported by the head in said slotted ridges, and a handle provided with a kerf for the engagement therein of the plate, and said kerfed end of the handle adapted to embrace the free ends of the central tines for stiffening the plate in one direction, and the said transverse ridges adapted to stiffen the plate in another direction.

3. A hand rake comprising a rake head of flat plate material, tine members lacedly fixed in the head, and a handle provided with a kerf for the engagement therein of the plate, said kerfed end of the handle adapted to embrace a tine-carrying portion of the plate for stiffening the plate.

4. In a hand rake, a head member comprising a generally flat plate having a strap-like portion struck up therefrom and cooperating with the plate laterally thereof to define a tine-receiving loop at a plate surface, said plate portion overlying an opening through the plate, and a flexible tine member disposed along said surface and engaged through said loop, the tine portion at said opening being offset thereinto and said strap-like plate portion being complementary in shape to said offset tine portion.

5. In a hand rake, a head member comprising a generally flat plate having a strap-like portion struck up therefrom and cooperating with the plate laterally thereof to define a tine-receiving loop at a plate surface, said plate portion overlying an opening through the plate, and a tine member disposed along said surface and engaged through said loop, the tine portion at said opening being permanently offset thereat to engage therein.

In testimony whereof, I affix my signature.

ORIN M. BULLOCK.